United States Patent [19]
Hanson

[11] 3,943,516
[45] Mar. 9, 1976

[54] STROBE GENERATOR
[75] Inventor: Orlando W. Hanson, Goleta, Calif.
[73] Assignee: The United States of America as represented by the Secretary of the Army, Washington, D.C.
[22] Filed: Nov. 20, 1962
[21] Appl. No.: 239,400

[52] U.S. Cl. ............ 343/18 E; 343/6 DF; 343/16 R; 343/118
[51] Int. Cl.² .......................................... G01S 3/66
[58] Field of Search ......... 343/118, 11, 6 DF, 5 ET, 343/16 R, 18 E

[56] References Cited
UNITED STATES PATENTS
2,557,869   6/1951   Gloess................................ 343/118

*Primary Examiner*—Maynard R. Wilbur
*Assistant Examiner*—Richard E. Berger
*Attorney, Agent, or Firm*—Nathan Edelberg; Robert P. Gibson; Jeremiah G. Murray

EXEMPLARY CLAIM

4. A strobe generator for a radar set which includes a rotatable directional antenna, a plan position indicator and has an interpulse period defined by the time between transmitted pulses, comprising; means to sweep said rotatable directional antenna past a source of enemy jamming signals, means to produce pulses of one polarity in response to increasing jamming signal strength on said antenna and pulses of the opposite polarity in response to decreasing jamming signal strength thereon, a first monostable multivibrator, said pulses being applied to said first monostable multivibrator, said first multivibrator being triggered only by said pulses of said one polarity, the output of said first multivibrator being applied to a second monostable multivibrator with a pulse length longer than the interpulse period of said radar set and means responsive to the resetting of said second multivibrator for initiating a strobe pulse for application to said plan position indicator of said radar set.

4 Claims, 2 Drawing Figures

INVENTOR,
ORLANDO W. HANSON

BY Harry M. Saragovitz

ATTORNEY.

STROBE GENERATOR

This invention relates to radar circuitry and more particularly to novel circuitry for indicating the bearing or azimuth, relative to the radar set, of an enemy jamming source. Means are provided for generating a strobe pulse in response to received jamming signals, said pulse being applied to the radar PPI (plan position indicator) to produce a radial strobe line or fiducial mark thereon at a position which accurately corresponds to the direction of arrival of the jamming signals.

It is therefore an object of this invention to provide a strobe generator circuit of improved accuracy.

Other objects and advantages of this invention will become apparent from the following detailed description and drawings, in which.

Figure 1:
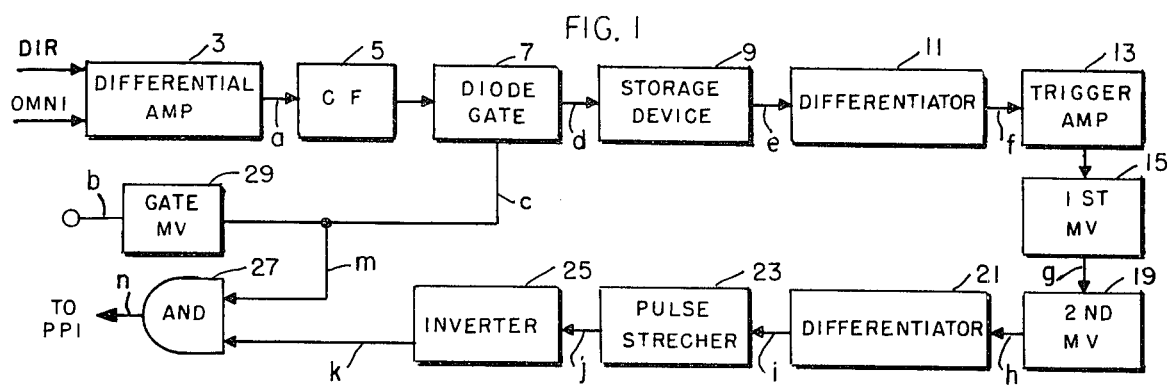
FIG. 1 is a block diagram of the circuit.
Figure 2:
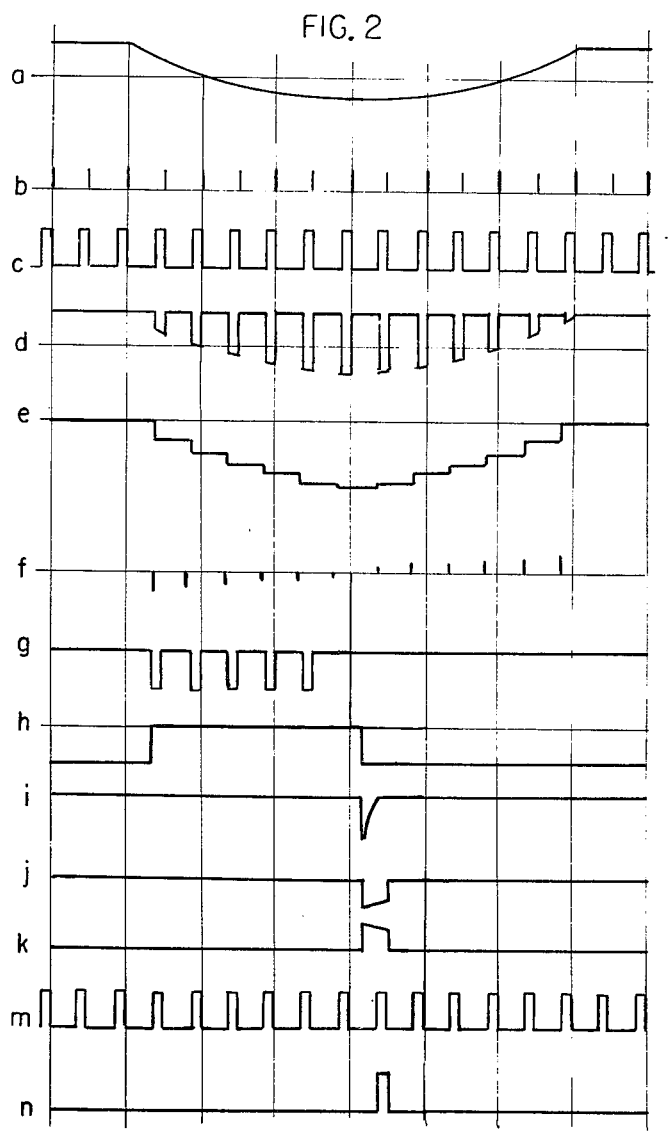
FIG. 2 illustrates the waveform in various parts of FIG. 1.

The radar has two antennas, one a rotating directional type and the other a fixed omnidirectional type, the latter arranged to cover the same elevation as the former. The gain of the omnidirectional antenna is made slightly higher than the side-lobe gain of the directional antenna, so that by substracting the signal in the omnidirectional channel from that in the directional channel spurious signals caused by pickup from the side-lobes of the directional antenna are canceled or blanked out. The subtraction is accomplished in differential amplifier 3 to which the detected video signals from both channels are fed. The waveform a, FIG. 2 shows the output of 3 as the rotating antenna sweeps past a source of CW jamming signals. The signal is applied through cathode follower 5 to diode clutter gate 7 which is open only during the last 25% of each sweep interval. The gating signal for 7 is obtained from the output of gate multivibrator 29 which is a monostable multivibrator which is triggered by the radar system pre-trigger pulses FIG. 2b, which are the same pulses used to trigger the radar set transmitter. The output of 29 is shown in FIG. 2c, the positive portions of which open gate 7 and apply the input thereof to storage device 9. The input to the storage device is a series of gradually increasing and then decreasing negative pulses, as illustrated in FIG. 2d. These pulses cause storage device 9, which may comprise a capacitor, to charge up in step fashion while the pulses are increasing in amplitude and then to discharge in like fashion as the pulses decrease in amplitude, as illustrated in FIG. 2e. It should be noted that gate 7 and storage device 9 together comprise a box-car detector. The charge on 9 is differentiated by 11 to determine whether the charge thereon has increased or decreased since the preceding pulse. The output of 11 will be a series of negative spikes if the charge on 9 is increasing and a series of positive spikes if the charge thereon is decreasing, as shown in FIG. 2f. The spikes are amplified by trigger amplifier 13 and the negative going spikes, indicative of increasing charge on 9, trigger first monostable multivibrator 15. Multivibrator 15 may be made responsive to negative spikes only by means of a unidirectional conducting device such as a diode, or by other well-known means. Multivibrator 15 has a pulse length of less than the radar imterpulse period or sweep interval and therefore will be triggered by each negative spike of sufficient amplitude applied thereto. The pulse output of the first multivibrator, FIG. 2g, is applied to a second monostable multivibrator 19, which has a pulse length or time constant longer than the radar interpulse period. The initial pulse from 15 sets 19 and succeeding pulses from 15 hold the second multivibrator in the set or unstable state. When the directional antenna is pointing at the jamming source the charge on storage device 9 stops increasing and no more negative spikes of sufficient ampltidue to trigger the first multivibrator are produced by differentiator 11, the first multivibrator stops producing pulses and the second multivibrator resets, FIG. 2h. The resetting of 19 is differentiated by 21, FIG. 2i, and is used to initiate the strobe pulse. It can be seen that the strobe pulse is initiated by the lack of increase in the output of the rotating antenna rather than a decrease therein. This yields increased azimuthal accuracy in the strobe pulse. It is difficult to detect a decrease in the antenna output near the center of the beam because the bluntness of the antenna pattern causes only slight differences in the received signal in this area. The spike output of 21 is applied to pulse stretcher 23, the output of which is shown in FIG. 2j. This pulse is inverted in 25 to form the positive going pulse of FIG. 2k. The output of 25 and the output of gate multivibrator 29, shown in FIG. 2m, which is a repeat of FIG. 2c, are applied to AND gate 27 to produce the strobe pulse of FIG. 2n, which accurately coincides with the azimuth of the jamming source and occupies the last 25% of the sweep interval in which it was initiated. It should be noted that the waveforms have been idealized to more clearly illustrate the principle of operation of the circuit. Actually the beamwidth of the directional antenna will normally contain about 35 sweep intervals.

While a preferred embodiment of the invention has been illustrated and described, it is obvious that many modifications thereof will be apparent to those skilled in the art, accordingly the scope of the invention should be limited only by the appended claims.

What is claimed is:

1. A strobe pulse generator for a pulse radar set, said radar set having a rotating directional antenna and a sweep interval defined by the time between transmitted pulses, said strobe pulse generator comprising; means to prevent spurious pickup from the side-lobes of said directional antenna, a clutter gate, means to feed the output of said antenna to the input of said clutter gate, means to open said clutter gate during the last 25% of each sweep interval of said radar set, a storage device connected to the output of said clutter gate, a first monostable multivibrator, means to trigger said first monostable multivibrator only in response to increasing charge on said storage device, a second monostable multivibrator, the output of said first multivibrator being arranged to maintain said second multivibrator in the set or unstable state, means responsive to the resetting of said second multivibrator to generate a pulse, an AND gate, means to feed said last-named pulse to one input of said AND gate and means to feed a gating pulse to the other input of said AND gate during the last 25% of each sweep interval.

2. A strobe pulse generator for a pulse radar set, said radar set comprising a rotating directional antenna, an omnidirectional antenna, a plan position indicator and having an interpulse period defined by the time between transmitted pulses, said strobe pulse generator comprising, a differential amplifier, means to feed the output of said rotating directional antenna and the output of said omnidirectional antenna to said differential amplifier, the gain of said last-named antenna being slightly greater than the side-lobe gain of said first-named antenna, a clutter gate, said clutter gate connected to the output of said differential amplifier, a gating multivibrator, said gating multivibrator connected to said clutter gate and arranged to open said gate during the final 25% of each interpulse period of said radar set, a storage device connected to the output of said clutter gate, a first differentiator connected to the output of said storage device, a first monostable multivibrator connected to the output of said first differentiator, said first multivibrator being triggered only by pulses indicative of increasing charge on said storage device, a second monostable multivibrator connected to the output of said first multivibrator, said second multivibrator having a pulse length longer than the radar set interpulse period, a second differentiator connected to the output of said second multivibrator, a pulse stretcher connected to the output of said second differentiator, an inverter connected to the output of said pulse stretcher, an AND gate, the output of said inverter being connected to one input of said AND gate, the other input of said AND gate being connected to the output of said gating multivibrator, the output of said AND gate being applied to said plan position indicator to produce a radial strobe line thereon.

3. A strobe generator for a radar set which includes a rotatable directional antenna, comprising; means to sweep said rotatable directional antenna past a source of enemy jamming signals, means to produce pulses of one polarity in response to increasing jamming signal strength on said antenna and pulses of the opposite polarity in response to decreasing jamming signal strength on said antenna, a monostable multivibrator, said pulses being applied to said monostable multivibrator being triggered only by said pulses of said one polarity, and means responsive to the cessation of pulse output from said monostable multivibrator to initiate a strobe pulse.

4. A strobe generator for a radar set which includes a rotatable directional antenna, a plan position indicator and has an interpulse period defined by the time between transmitted pulses, comprising; means to sweep said rotatable directional antenna past a source of enemy jamming signals, means to produce pulses of one polarity in response to increasing jamming signal strength on said antenna and pulses of the opposite polarity in response to decreasing jamming signal strength thereon, a first monostable multivibrator, said pulses being applied to said first monostable multivibrator, said first multivibrator being triggered only by said pulses of said one polarity, the output of said first multivibrator being applied to a second monostable multivibrator with a pulse length longer than the interpulse period of said radar set and means responsive to the resetting of said second multivibrator for initiating a strobe pulse for application to said plan position indicator of said radar set.

* * * * *